United States Patent Office
3,639,398
Patented Feb. 1, 1972

3,639,398
QUATERNIZED REACTIVE ANTHRAQUINONE DYESTUFFS CONTAINING TRIAZINE AND NICOTINIC ACID GROUPS
Sandro Ponzini, Castelli Saronno, Monza Paolo, and Jean Stanislao Lawendel, Milan, Italy, assignors to Aziende Colori Nazionali Affini ACNA S.p.A., Milan, Italy
No Drawing. Application June 5, 1968, Ser. No. 749,899, now Patent No. 3,522,232, dated July 28, 1970, which is a division of application Ser. No. 472,668, July 16, 1965, now Patent No. 3,416,875, dated Dec. 17, 1968. Divided and this application Mar. 19, 1970, Ser. No. 21,222
Int. Cl. C07d 55/22
U.S. Cl. 260—249
2 Claims ABSTRACT OF THE DISCLOSURE
Reactive triazine dyestuffs having the formula:

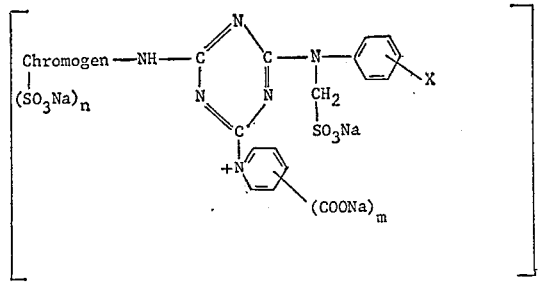

wherein the chromogen is an anthraquinone dyestuff residue, said chromogen being attached to the —NH— bridging group through a carbon atom of an aromatic nucleus selected from the group consisting of the nuclei of the phenyl series, wherein X is selected from the group consisting of H, $CH_3$, $OCH_3$ and $OC_2H_5$, $n$ is an integer from 1 to 4, and $m$ is 1 or 2, are effective for dyeing cellulose fibers. The dyestuffs may be absorbed and fixed onto the cellulose fibers by known hot or cold dyeing techniques. Intense dyeings having very good fastness to washing are obtained.

CROSS REFERENCE TO RELATED APPLICATIONS

This application is a division of copending application Ser. No. 749,899, filed June 5, 1968, now U.S. Pat. No. 3,522,232, which application is a division of application Ser. No. 472,668, filed July 16, 1965, now U.S. Pat. 3,416,875.

BACKGROUND OF THE INVENTION (1) Field of the invention

This invention relates to a series of reactive triazine dyestuffs capable of being absorbed and chemically fixed on cellulose fibers by either a cold or warm dyeing process.

(2) Description of the prior art

Various classes of dyestuffs having reactive groups capable of forming such bonds are already known. These include dyestuffs containing at least one of the following reactive groups: monochlorotriazinyl, dichlorotriazinyl, trichloropyrimidyl, vinylsulfonic, and dichloroquinoxalyl. The dyeing conditions for applying these dyestuffs vary according to the nature of the groups present.

SUMMARY OF THE INVENTION

The dyestuffs of the present invention are prepared by a quaternization reaction of the reactive triazine dyestuffs having the general formula:

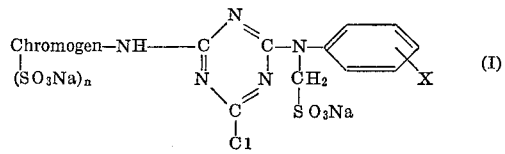

wherein X is selected from the group consisting of H, $CH_3$, $OCH_3$, and $OC_2H_5$; $n$ is an integer from 1 to 4, and the chromogen is the colored residue of an anthraquinone dyestuff.

The reactive quaternized dyestuffs of the present invention have the general formula:

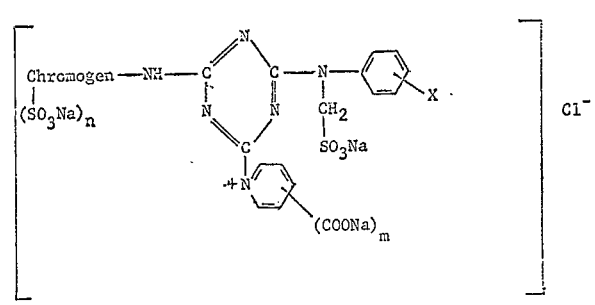

wherein X and $n$ have the above mentioned meanings, and $m$ is 1 or 2. The chromogen is a dyestuff residue of an anthraquinone dyestuff. The reactive quaternized dyestuffs of the present invention may be prepared by reacting a metal salt of isonicotinic acid with the reactive dyestuff of the general Formula I.

DESCRIPTION OF THE PREFERRED EMBODIMENT

The reactive dyestuffs of the present invention have improved characteristics for applications in dyeing with remarkably increased dyeing yields and possess the further advantage that they may be used by both cold and warm dyeing applications. It is quite unexpected that by quaternizing the dyestuffs of the general Formula I with a metal salt of isonicotinic acid, dyeing yields higher than those obtained by the use of a dyeing catalyst based on other organic tertiary amines can be obtained using the cold application method. This is particularly surprising with respect to the aliphatic tertiary amines, such as asymmetric dimethylhydrazine, since it is known that the hydrosolubilizing substitutents ($SO_3H$, $COOH$) diminish the affinity of dyestuffs for cellulose fibers.

Also, using the dyestuffs of the present invention in a warm dyeing application, i.e., 60–90° C., the dyeing yields on cellulose are substantially improved over those obtained with the prior art dyestuffs.

The use of isonicotinic acid as the quaternizing agent of the above mentioned chlorotriazine dyestuffs generally produces the following advantages with respect to the use of other quaternizable tertiary amines, namely:

(1) Dyeing of cellulose fibers by the cold process without adding dyeing catalysts.

(2) Increasing remarkably, in most cases, the dyeing yields, particularly in the cold dyeing process, even when compared to the use of known dyeing catalysts based on aliphatic tertiary amines.

(3) In contrast to the other tertiary amines, isonicotinic acid is odorless, and therefore the dye baths, both cold and warm, are completely free of disagreeable or irritating odors.

(4) Increasing of the dye solubility in the cases where it is particularly poor.

(5) Possibility of dyeing cellulose materials in a warm dye bath by generally used processes, using the same quaternized dyes in those particular cases where practical considerations might suggest this method as the preferable one.

The use of isonicotinic acid, also from the point of view of the costs, is advantageous because the excess of isonicotinic acid used in the quaternization reaction may be easily recovered from the mother liquors by filtration, after acidification of these mother liquors, and then it may be reused.

The quaternization reaction is generally carried out by dissolving the reactive anthraquinone dyestuff in a 2% solution of a metal salt of the isonicotinic acid.

The reaction temperature may be varied within wide limits, but it is preferably kept between 60 and 80° C. The reaction rate is obviously influenced by the selected temperature and may be controlled by chromatographic analysis.

The following examples serve to further illustrate the present invention without in any way limiting the scope thereof:

EXAMPLE 1

2 parts of isonicotinic acid and 0.64 part of 100% NaOH are dissolved in 100 parts of water, at 80° C. 5 parts of the dyestuff:

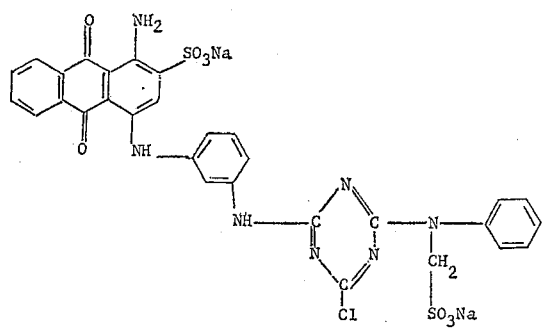

are added to the solution.

The solution is maintained at this temperature for one night (about 15 hours), and then the dyestuff is separated by direct drying at about 60° C.

The dyestuff obtained dyes cotton at the temperature of 60° C. with good tinctorial yields, in a blue shade having very good fastness to washing.

The dyestuffs to be quaternized used in the process can be obtained as follows:

0.1 mol of 1-amino-4-(3'-amino-anilino-)-2 anthraquinone sulfonic acid are salted out in 1500 parts of water by addition of sodium carbonate.

The mass is then added at 0–5° C. to a solution (kept at 0–5° C.) of the condensation product between cyanuric chloride and the sodium salt of the anilino methanesulfonic acid. (This condensation product is prepared by dissolving 0.1 mol of the sodium salt of anilino methanesulfonic acid in 500 parts of water, adding 17 parts of sodium bicarbonate to the solution, and while maintaining the solution at a temperature of 0–5° C., adding a suspension (kept at 0–5° C.) of 0.1 mol of cyanuric chloride in 1500 parts of water.)

The temperature is then permitted to rise to 20–25° C., and is kept at this value until the condensation is ended. The intermediate dyestuff obtained is separated by salting out.

The quaternized dyestuff prepared in this example has the following structure:

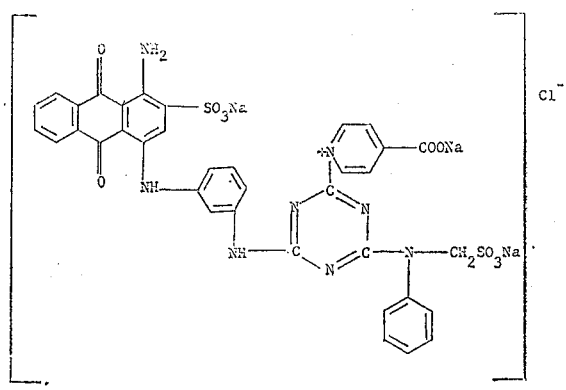

EXAMPLE 2

A dye bath is prepared by dissolving 2 parts by weight of the dyestuff prepared according to Example 1, in 2000 parts by volume of water at a temperature of 60° C.

100 parts of the cellulose material are introduced in the dye bath; after 15 minutes, 60 parts of anhydrous $Na_2SO_4$ are added; after 30 minutes, 60 parts of anhydrous $Na_2SO_4$ are added; after 45 minutes, 15 parts of $Na_2CO_3$ are added; after 60 minutes, 15 parts of $Na_2CO_3$ are added.

The bath is maintained at 60° C. for one further hour, in order to complete the fixing of the dyestuff, and then the material is soaped for 30 minutes at the boiling point with a 3% soap solution.

The dyed cellulose material possessed a high fastness to wet treatment and had a good tinctorial yield.

Variations and modifications can, of course, be made without departing from the spirit and scope of the invention.

Having thus described the invention, what is desired to be secured by Letters Patent and is hereby claimed is:

1. The reactive dyestuff having the formula:

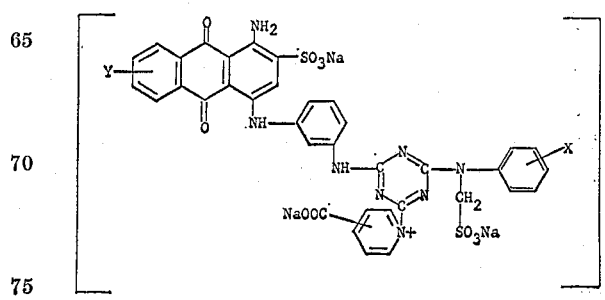

wherein Y is H or $SO_3Na$ and X is H, $CH_3$, $OCH_3$ or $OC_2H_5$.
2. The reactive dyestuff having the formula:
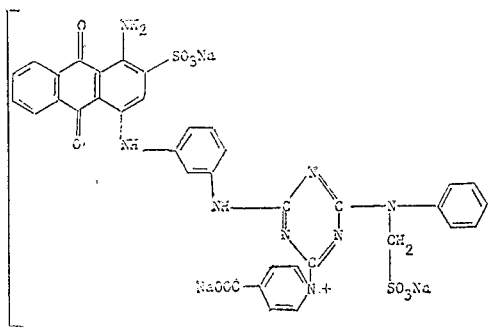
References Cited
UNITED STATES PATENTS
| | | | |
|---|---|---|---|
| 3,073,824 | 1/1963 | Gunst et al. | 260—249 |
| 3,095,415 | 6/1963 | Staeuble et al. | 260—249 |
| 3,499,896 | 3/1970 | Neeff | 260—249 |
JOHN M. FORD, Primary Examiner
U.S. Cl. X.R.
8—40, 54.2

PO-1050
(5/69)

UNITED STATES PATENT OFFICE
CERTIFICATE OF CORRECTION

Patent No. 3,639,398     Dated February 1, 1972

Inventor(s) Sandro Ponzini, Paolo Castelli & Jean Stanislao Lawendel

It is certified that error appears in the above-identified patent and that said Letters Patent are hereby corrected as shown below:

Column 1, line 5: "Sandro Ponzini, Castelli Saronno, Monza Paolo, and Jean" should read -- Sandro Ponzini, Saronno, Paolo Castelli, Monza, and Jean --; Column 2, line 9: "a quaternization reaction of the" should read -- quaternizing a --; Column 2, line 21: "the chromogen" should read -- Chromogen --; Column 2, line 61: "substitutents" should read -- substituents --; Column 3, line 27: "the costs," should read -- cost, --; Column 3, line 27: "the excess of" should read -- the excess --; Column 3, line 71: "dyestuff obtained" should read -- obtained dyestuff --; Column 3, line 71: "the temperature" should read -- a temperature --; Column 4, line 6: "the anilino" should read -- anilino --; Column 4, line 65, in Claim 1, second structural formula, lines 65-75, that portion of the formula reading "            ]
             ]         should read         ]  Cl⁻
             ]"                             ]    --.

Signed and sealed this 18th day of July 1972.

(SEAL)
Attest:

EDWARD M. FLETCHER, JR.          ROBERT GOTTSCHALK
Attesting Officer                Commissioner of Patents

PR